Oct. 2, 1928.
W. O. KENNINGTON
1,686,012
WINDSHIELD HEATER
Filed Nov. 14, 1925
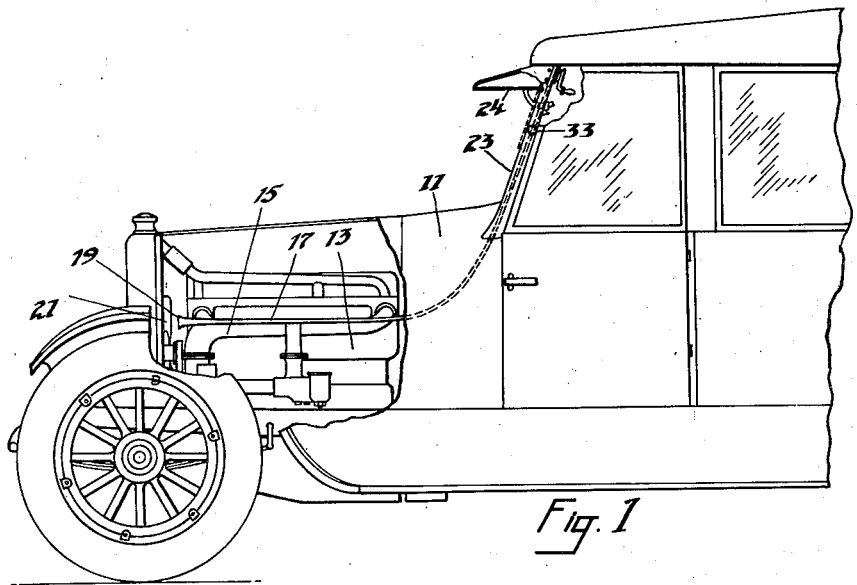
Fig. 1
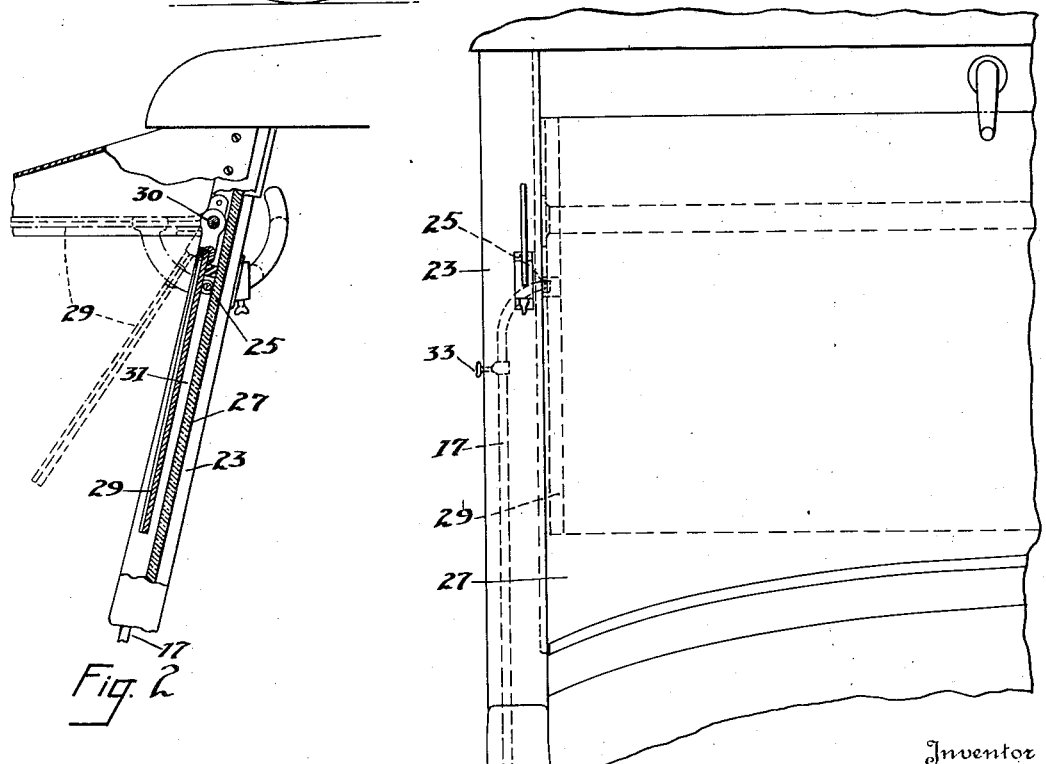
Fig. 2
Fig. 3
Inventor
WILLIAM O. KENNINGTON
By Blackmore, Spencer & Hulit.
Attorney Patented Oct. 2, 1928.

1,686,012

UNITED STATES PATENT OFFICE.

WILLIAM O. KENNINGTON, OF LONDON, ENGLAND, ASSIGNOR TO GENERAL MOTORS CORPORATION, OF DETROIT, MICHIGAN, A CORPORATION OF DELAWARE.

WINDSHIELD HEATER.

Application filed November 14, 1925. Serial No. 69,207.

This invention relates to a heater and more particularly to a heater for the windshield of an automobile in which heated air is supplied to a windshield to obviate the accumulation of moisture thereon.

According to one feature of the invention, the air is heated while passing through a conduit and directed to the exterior of a windshield. An auxiliary shield is shown pivoted to the upper portion of the windshield, which forms one means of providing a space for the heated air confining it more to that portion of the windshield to be heated.

The above and other objects and features of the invention, including various novel combinations and desirable particular constructions, will be apparent from the following description of the illustrative embodiment of the invention shown in the accompanying drawings, in which:

Figure 1 is a side elevation, partly in section, of a portion of an automobile showing one form of the device in position;

Figure 2 is a section through the windshield; and

Figure 3 is a rear elevation of the windshield.

Referring to the drawings, an automobile 11 is shown with the usual motor 13 provided with an exhaust manifold 15. A conduit 17, adjacent the manifold 15, is provided with an enlarged forward end 19 adapted to receive a current of air caused by the fan 21. The conduit 17 is extended rearwardly and upwardly through a windshield post 23 with its opposite end 25 arranged to direct heated air upon the exterior of a windshield 27.

The open end 25 is positioned in such a manner that the air current is directed across the windshield and to confine the air more to that portion of the windshield to be heated an auxiliary shield 29 is shown pivoted at 30 to the upper portion of the windshield post 23. When in a position as shown in full lines in Figure 2 a space 31 is provided for the circulation of a film of air against the windshield.

One means of heating the current of air is shown by locating the conduit 17 adjacent the exhaust manifold 15 and as the air is blown through the conduit it is heated. Other means of heating may be used, such as electric, but for the purpose of illustration the above construction is shown.

The heating of the space 31 prevents the accumulation of moisture on the windshield and auxiliary shield as well as melts any ice that may form on the exterior of either, thus giving the driver a clear vision windshield at all times.

A valve 33 is shown to regulate the supply of heated air to the windshield. This valve may be closed and the auxiliary shield 29 swung to a position, shown in dotted lines in Figure 2, when it is not necessary to keep the windshield free from moisture or ice.

While one illustrative embodiment of my invention has been described at length, it is not my intention to limit its scope by the above description, or otherwise than by the terms of the appended claims.

I claim:

1. A windshield including combination, a pair of spaced transparencies, the space therebetween having an opening to atmosphere along its lower side, and means to introduce heat into the space at the top thereof.

2. A windshield including in combination, transparencies having an intermediate space therebetween, said space being closed at its top and sides, the bottom of the space being open, a conduit for hot air communicating with said space at the top thereof, the air introduced into said space descending to escape thru the open bottom as its heat is dispelled to warm the transparencies.

3. A windshield including in combination, a main transparency, an auxiliary transparency relatively adjustable to an operative position of substantial parellelism with said main transparency, a vizor projecting forwardly of the windshield and serving to conceal said auxiliary transparency when it is in an inoperative position of adjustment, the operative adjustment position affording an intermediate space between the respective transparencies, and means to heat said space.

4. A device of the character described, including in combination hollow supporting standards, a pair of spaced transpariencies carried by the standards, and a conduit for hot air, embodied in one of the hollow supporting standards and communicating with the space between said transparencies.

5. The combination set forth in claim 4 and a valve controlling the communication between the conduit and space.

6. A device of the character described, including in combination, hollow supporting standards, a pair of spaced transparencies carried by the standards, a conduit for hot air embodied in one of said hollow supporting standards and communicating with the space between said transparencies, a valve controlling the flow of hot air into said space, and an explosive engine having an exhaust manifold associated with said conduit to heat the air passing therethru.

In testimony whereof I affix my signature.

WILLIAM O. KENNINGTON.